S. GUILBERT.
Car Brake.
No. 54,333. Patented May 1, 1866.
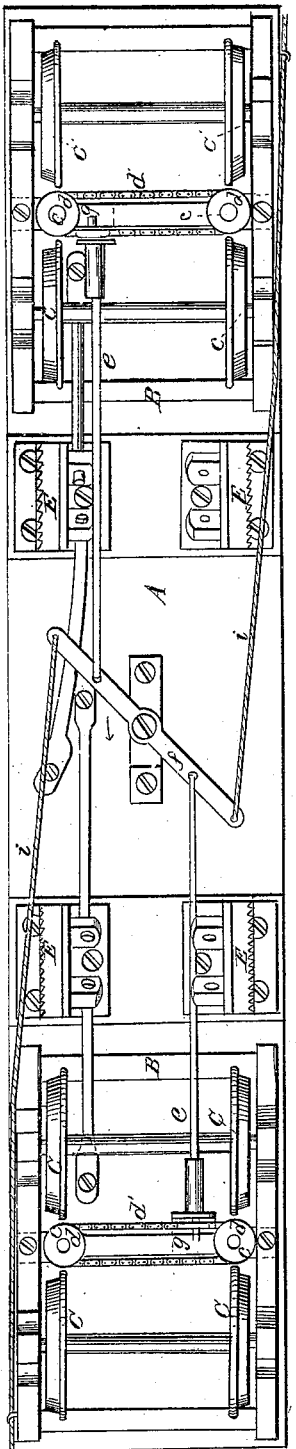
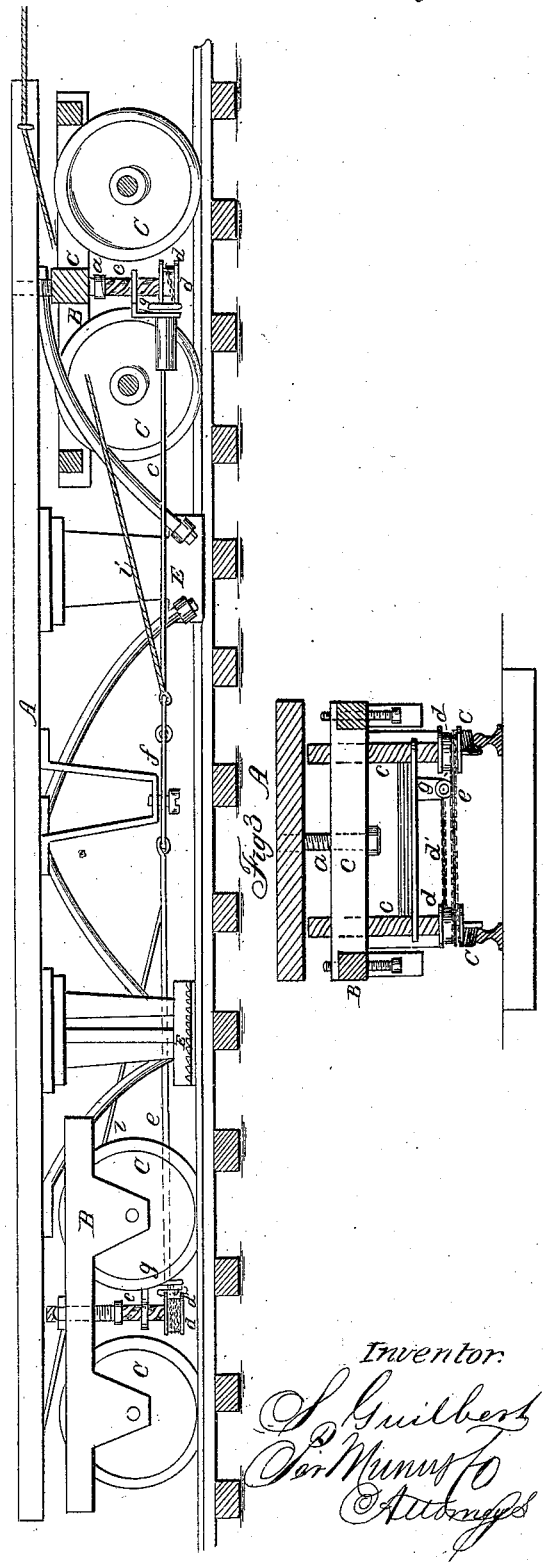
Witnesses:
Inventor:

UNITED STATES PATENT OFFICE.

SIVÉ GUILBERT, OF NEW YORK, N. Y.

IMPROVED CAR-BRAKE.

Specification forming part of Letters Patent No. 54,333, dated May 1, 1866.

*To all whom it may concern:*

Be it known that I, SIVÉ GUILBERT, of the city, county, and State of New York, have invented a new and Improved Car-Brake; and I do hereby declare that the following is a full, clear, and exact description thereof, which will enable others skilled in the art to make and use the same, reference being had to the accompanying drawings, forming a part of this specification, in which—

Figure 1 represents an inverted plan of this invention. Fig. 2 is a longitudinal vertical section of the same. Fig. 3. is a transverse vertical section of the same.

Similar letters of reference indicate like parts.

This invention consists in a car-brake which is operated by imparting to the platform a rising and falling motion in such a manner that when the platform is permitted to descend brake-shoes attached to the under surface of the same are brought to bear upon the rails, and by the friction thus created the motion of the car is checked. The mechanism by which the platform of the car is elevated and allowed to descend consists of two pairs of screws with steep threads, one pair in each truck. Each pair of these screws is geared together by an endless chain, and a bolt, which connects with the brake-lever, passes through a ring in said chain and prevents the screws from turning. As soon as the bolt is withdrawn the weight of the platform or of the body of the car causes the screws to revolve until the brake-shoes bear on the upper surfaces of the rails, whereby the motion of the car is checked. By turning the screws back to their original position the platform is raised and the brakes are taken off.

A represents the platform of an ordinary railroad-car, which is supported by two trucks, B, each of which is provided with two pairs of wheels, C. The connection between the truck and the platform A is effected by king-bolts $a$, which screw into the platform and pass loosely through the central cross-bar, $b$, of the trucks, so that said platform is free to rise and fall.

When the car is in running order the platform A rests upon four screws, $c$, with very steep threads, which are tapped into the central cross-bars of the trucks, two in the forward truck and two in the rear truck, as shown, and on the lower ends of these screws are mounted pulleys or chain-wheels $d$, so that each pair of screws can be connected by an endless chain, $d'$, stretched over the appropriate pulleys. By means of these chains each pair of screws is compelled to turn simultaneously in either direction, and neither of the screws in one and the same truck is permitted to revolve without the other.

The weight of the platform and car pressing on the upper ends of the screws has a tendency to cause them to revolve, so that the platform is permitted to sink unless the screws are stopped. For the purpose of stopping the screws and to prevent the platform from sinking down spontaneously, two bolts, $e$, are applied, which extend from the opposite ends of a lever, $f$, and which catch into rings $g$, secured in the chains $d'$. By turning the lever in the direction of the arrow marked near it in Fig. 1, the bolts $e$ are withdrawn from the rings in the chains and the screws are permitted to revolve by the downward pressure of the platform and car.

The lever $f$ is operated by ropes or chains $i$, which extend to the opposite ends of the car, and are operated by a hand-wheel or other suitable means.

To the under surface of the platform A are firmly secured the brake-shoes E, in such a position that the same bear down upon the surface of the rails when the platform is permitted to descend; but if the platform is elevated by the action of the screws $c$, and as long as these screws are stopped by the bolts $e$, the brake-shoes are in such a position that they do not come in contact with the rails.

If it is desired to apply the brakes, the lever $f$ is turned by pulling either one of the chains $i$, and thereby the bolts $e$ are withdrawn from the rings $g$ and the screws $c$ are permitted to turn. The platform is thereby permitted to sink down, causing the brake-shoes to bear upon the surface of the rails.

In order to take off the brakes the screws $c$ are turned back to their original position by hand or by suitable mechanism, and thereby the platform is raised and the brake-shoes are elevated clear off the rails.

By this arrangement a very effective brake is obtained, which will be easily operated, and which will be capable of stopping a train in a comparatively short distance.

What I claim as new, and desire to secure by Letters Patent, is—

The chains $d'$ and bolts $e$, in combination with the screws $c$ and with the platform of a car, constructed and operating substantially as and for the purpose set forth.

SIVÉ GUILBERT.

Witnesses:
    W. HAUFF,
    M. M. LIVINGSTON.